United States Patent
Fowell et al.

[11] Patent Number: 5,826,828
[45] Date of Patent: Oct. 27, 1998

[54] SUN/EARTH ACQUISITION WITHOUT THRUSTERS

[75] Inventors: Richard A. Fowell, Culver City; John F. Yocum, Jr., Rancho Palos Verdes, both of Calif.

[73] Assignee: Hughes Electronics Corporation, Los Angeles, Calif.

[21] Appl. No.: 597,083

[22] Filed: Feb. 5, 1996

[51] Int. Cl.[6] .................................................. B64G 1/24
[52] U.S. Cl. ........................ 244/164; 244/165; 244/168; 244/170
[58] Field of Search .................. 244/164, 165, 244/168, 170; 701/13

[56] References Cited

U.S. PATENT DOCUMENTS

| | | |
|---|---|---|
| 3,591,108 | 7/1971 | Perkel et al. . |
| 3,637,170 | 1/1972 | Paine et al. . |
| 3,940,096 | 2/1976 | Keigler et al. . |
| 4,193,570 | 3/1980 | Hoffman et al. . |
| 4,275,861 | 6/1981 | Hubert . |
| 4,306,692 | 12/1981 | Kaplan et al. . |
| 4,358,076 | 11/1982 | Lange et al. . |
| 4,508,297 | 4/1985 | Mouilhayrat et al. ................... 244/165 |
| 5,020,744 | 6/1991 | Schwarzschild . |
| 5,035,381 | 7/1991 | Matthews . |
| 5,067,673 | 11/1991 | Fong . |
| 5,080,307 | 1/1992 | Smay et al. . |
| 5,139,218 | 8/1992 | Bird et al. ............................... 244/165 |
| 5,149,022 | 9/1992 | Flament ................................... 244/165 |
| 5,172,876 | 12/1992 | Rahn . |
| 5,441,222 | 8/1995 | Rosen . |
| 5,452,869 | 9/1995 | Basuthakur et al. ..................... 244/165 |
| 5,611,505 | 3/1997 | Smay ....................................... 244/165 |

OTHER PUBLICATIONS

Beachley, Norman H. et al.; "Wobble–Spin Technique for Spacecraft Inversion and Earth Photography"; *J. Spacecraft;* vol. 6, No. 3; Mar. 1969; pp. 245–248.

Kane, T. R. et al.; "A Method of Active Attitude Control Based on Energy Considerations"; *J. Spacecraft;* vol. 6, No. 5; May 1969; pp. 633–636.

Weiss, R. et al.; "Scan–by–Nutation: A Spacecraft Control and Scan Motion Concept"; *J. Spacecraft;* vol. 12, No. 11; Nov. 1975; pp. 689–696.

M. Schwarzschild and S. Rajaram, "Attitude Acquisition System for Communication Spacecraft", Journal of Guidance, Control and Dynamics, vol. 14, (1991) May/Jun., No. 3, Washington D. C., pp. 543–547.

*Primary Examiner*—Galen L. Barefoot
*Attorney, Agent, or Firm*—Elizabeth E. Leitereg; Terje Gudmestad; Michael W. Sales

[57] ABSTRACT

Methods for performing attitude maneuvers of a spinning satellite without the use of thrusters, or with a minimal number of thrusters, are disclosed. The attitude maneuvers are primarily achieved through the use of gimballed momentum wheels and solar wing drives. Various maneuvers can be performed depending on whether the satellite has near-zero net momentum or significant net momentum. The maneuvers include sun acquisition, sun hold, Earth acquisition and inversion.

11 Claims, 2 Drawing Sheets

SUN/EARTH ACQUISITION WITHOUT THRUSTERS

TECHNICAL FIELD

This invention broadly relates to positioning of spacecraft and more particularly to attitude control.

BACKGROUND ART

Attitude control of spin-stabilized spacecraft has traditionally been accomplished by pulsed thrusters which provide spin-phased moments. A large number of thrusters are usually necessary regardless of whether the satellite uses three-axis thruster control or is a dual-spin satellite. Attitude thruster maneuvers are undesirable because they require additional actuators beyond those used in normal on-station operation. They also consume irreplaceable propellant and thus reduce the useful life of the spacecraft, and often disturb the satellite orbit by inducing velocity changes. Moreover, if performed incorrectly, attitude thruster maneuvers can increase satellite angular rates where centrifugal forces could damage the satellite structure.

Conventional satellites also have other disadvantages, such as the unavailability of solar power until completion of the acquisition maneuver, frequent reliance on passive nutation damping to settle the maneuver (which is time consuming and constrains mass properties), and the risk of satellite battery depletion in the event of misdesign.

Dual-spin satellites are shown, for example, in U.S. Pat. Nos. 3,940,096 and 5,020,744. Also, one known method for attitude inversion without the use of thrusters is described in U.S. Pat. 5,067,673. This technique uses cross-product coupling for nutation stabilization/destabilization.

SUMMARY OF THE INVENTION

It is an object of the present invention to provide a method and apparatus for performing and controlling attitude maneuvers of a spacecraft without necessitating the use of thrusters, or through the use of a minimum number of thrusters. It is another object of the present invention to perform attitude maneuvers of a satellite, such as sun acquisition, sun hold, Earth acquisition, and inversion maneuvers, without using thrusters, or through the use of a minimum number of thrusters.

It is still another object of the present invention to allow a reduction in the number of attitude thrusters used on known satellites, increase fuel life, simplify orbital operations, and provide enhanced autonomy. It is a still further object of the invention to reduce the cost of satellites by reducing the number of attitude control thrusters normally utilized.

These and other objects, benefits and features of the invention will become apparent from the following description of the invention, when viewed in accordance with the drawings and appended claims.

As indicated, the present invention generally relates to an apparatus and method for attitude control and operation of attitude maneuvers of a spinning spacecraft through minimum or no use of reaction control thrusters. The invention is particularly useful for geosynchronous satellites which typically use thirteen to sixteen thrusters on a three-axis control satellite and six thrusters on a dual-spin satellite. In particular, the attitude maneuvers are performed through the use of a gimballed momentum wheel and solar wing drives on the satellite, rather than thrusters.

In one embodiment of the present invention, a series of maneuvers are carried out by use of a momentum wheel and the solar panels in a near zero-momentum satellite control procedure. The momentum wheel is gimballed and the wheel momentum is reoriented and repositioned in the satellite. A slewing (i.e. turning or twisting) of the satellite transverse to the wheel spin axis is accomplished by appropriate spin-phasing of the momentum wheel offset. Through a certain sequence of use of momentum wheel components, sun panel orientation, and slewing of the satellite around various axes, when combined with a minimal use of thrusters, various attitude maneuvers can be effectuated in this manner.

Where the satellite has significant net momentum, inversion maneuvering, dual-spin turns, and deliberate creation and maintenance of 45° of nutation can be accomplished through use of the present invention. This is carried out by first deliberately inducing a flat spin by use of a momentum wheel gimbal, "vee-wheel" arrangement or transverse reaction wheels, and then later performing a flat-spin recovery.

DESCRIPTION OF THE PREFERRED EMBODIMENT

The present invention particularly concerns a class of satellites, such as HS601 satellites developed by Hughes Space and Communications Company, which can store significant angular momentum along one body direction (for example, in a momentum wheel) and have a limited capability for storing angular momentum in a direction transverse to the body direction. The latter is caused, for example, by limited angular range gimbals on the momentum wheel, "vee-wheel" arrangements, or small transverse reaction wheels.

Figure 1:
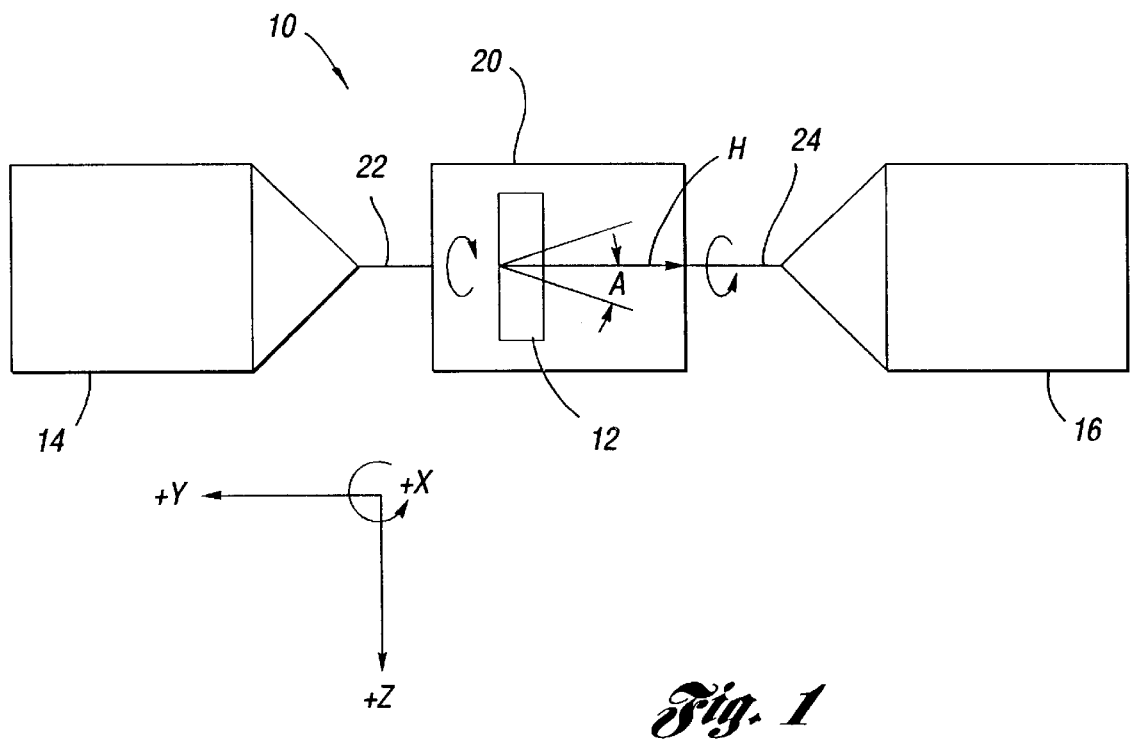
FIG. 1 is a schematic illustration of a three-axis stabilized satellite with a momentum wheel.

A typical satellite configuration is shown schematically in FIG. 1. The satellite 10 includes a bias momentum wheel 12 inside a body 20. The momentum wheel 12 has an angular momentum H along the −Y direction. The satellite 10 has a spin inertia $I_s$ counterspun at a rate $+\omega_s$ along the +Y direction, where $\omega_s$ is chosen so the satellite's spin momentum is equal and opposite to the wheel momentum. As a result, the system as a whole has a near-zero momentum.

A pair of solar panels 14 and 16 are attached to the body 20 of the satellite. The solar panels 14 and 16 are rotated by solar wing drives 22 and 24 at a rate of $-\omega_s$. This counters the effects of the satellite rotation and keeps the solar panels pointed toward the sun.

The momentum wheel 12 is gimballed so that the wheel momentum can be reoriented within the satellite anywhere within a cone of angular radius A, and repositioned at an angular rate of $\omega_g$ within that cone. The momentum wheel also has a spin motor (not shown) which controls the spin speed as conventionally known.

The principal inertia axes of the satellite are parallel to the X, Y and Z-axes shown in FIG. 1 and are centered on the center of mass of the satellite. The X-axis is the roll axis, the Y-axis is the pitch axis, and the Z-axis is the yaw axis. Initially, the inertia of the X-axis is the same as the inertia of the Z-axis, that is $I_x$ equals $I_z$.

The present invention has particular use for two classes of maneuvers. The first maneuver is utilized when the satellite has near-zero net momentum. This means that the system momentum is less than half the internal transverse momentum storage capability. The maneuvers use slews transverse to the spin axis of a zero-momentum dual-spin configuration.

The second class of maneuvers is used when the satellite has significant net momentum, that is up to the order of the main internal transverse momentum storage capacity. These maneuvers use control laws that cause control growth or damping of nutation.

For a description of zero-momentum satellite control, the components of the satellite described above with reference to FIG. 1 will be utilized. As indicated, initially the inertia of the satellite around the X-axis is the same as inertia around the Z-axis. To rotate the satellite about the +Z axis, the momentum wheel is gimballed off by an angle of $\phi$ from the +X-axis. The angle $\phi$ is less than the angle A which is the angular radius of the cone. This maneuver gives the momentum wheel angular momentum component along the inertial direction $-Z$ equal to $H\sin(\phi)$. By the conservation of angular momentum, the satellite body must therefore have an angular momentum along the +Z-axis of $H\sin(\phi)$. Also, since it is assumed that this direction is the principal axis of inertia for the satellite, the satellite body must have a transverse angular rate along the +Z-axis of $H\sin(\phi)/I_z$.

To maintain this slew about the inertial Z-axis, it is necessary to keep the wheel transverse angular momentum fixed in inertial space. Since the wheel is affixed to the rotating satellite, the wheel offset must be coned about the negative Y-axis at the rate of $-\omega_s$ to keep it inertially fixed. This requires a gimbal rate of $\omega_s\sin(\phi)$. In order to cease the rotation, the wheel transverse offset, $\phi$, is set to zero.

Similarly, the satellite can be slewed in any direction transverse to the wheel spin axis by appropriate spin-phasing of the momentum wheel offset. When the satellite inertia properties are not as ideal as those assumed above, the motion of the wheel becomes more complex than the simple circular cone described above. However, the basic approach remains the same, the satellite should have a particular inertial angular rate. The desired inertial rate in the body frame is expressed relative to the attitude profile. From this desired angular rate in the body frame, the desired satellite angular momentum profile in the body frame is calculated using conventional satellite inertial properties. This can be supplied by commanding the negative of the angular momentum offset to the nominal wheel motion. Any errors in tracking the desired satellite body angular rates can be removed by providing a feedback loop that senses body rate tracking errors with rate gyros.

In this maneuvering, a certain amount of non-zero net momentum can be tolerated. For example, the Y-component can be absorbed into the wheel by changing the wheel spin speed, and the transverse component can be absorbed by gimbaling the wheel and coning it at $-\omega_s$. This can be done particularly if the satellite has rate gyros, since any such momentum will show up as non-zero X and Y satellite rates. For this purpose, the coning will always be a circular cone, regardless of satellite inertial properties.

Another possible perturbation results when the satellite Y-axis is not a principal moment of inertia. In this case, maintaining a satellite angular rate parallel to the Y-axis implies a satellite angular momentum component in the X-Z plane. In order to sustain such motion, a body-fixed momentum wheel gimbal offset must be carried out to counter it. Otherwise the satellite will wobble.

A satellite nutation, which is a principal concern for spinning satellites, is barely recognizable here, since the nutation frequency is normally zero. However, any undesired transverse rates could be removed from the system, for example by detecting them with gyros and removing them with the gimbal wheel.

For sensing, the usual complement of sensors in conventional satellites is utilized. This includes the three-axis rate gyros with integrated rate for angle estimates and a static Earth sensor. It also includes two slit sun sensor fans centered on the satellite +X axis: one situated in the X-Y plane (PSI-3/4) and one rotated 35° about the +X axis from the X-Z plane (PSI-2). In this regard, a static Earth sensor has a 20° diameter conical field of view along the +Z axis.

Usually, the satellite does not begin and end the maneuvers in a zero-momentum state. Thus, thrusters are needed to take the satellite from the initial momentum state to zero before the maneuver, and then to infuse the desired momentum after the maneuver is completed. Generally, this only requires a spin-down and spin-up maneuver, together with nutation damping, all of which can be achieved using the limited thruster complement of the spinning satellite, as opposed to the numerous thrusters required for the typical body-stabilized satellite. Preferably, only two thrusters are necessary: e.g., one which produces a $-Z$ torque to spin down the satellite after transfer orbit, and one to produce a $-Y$ torque to infuse the momentum into the momentum wheel for on-station operation after acquisition.

Figure 2:
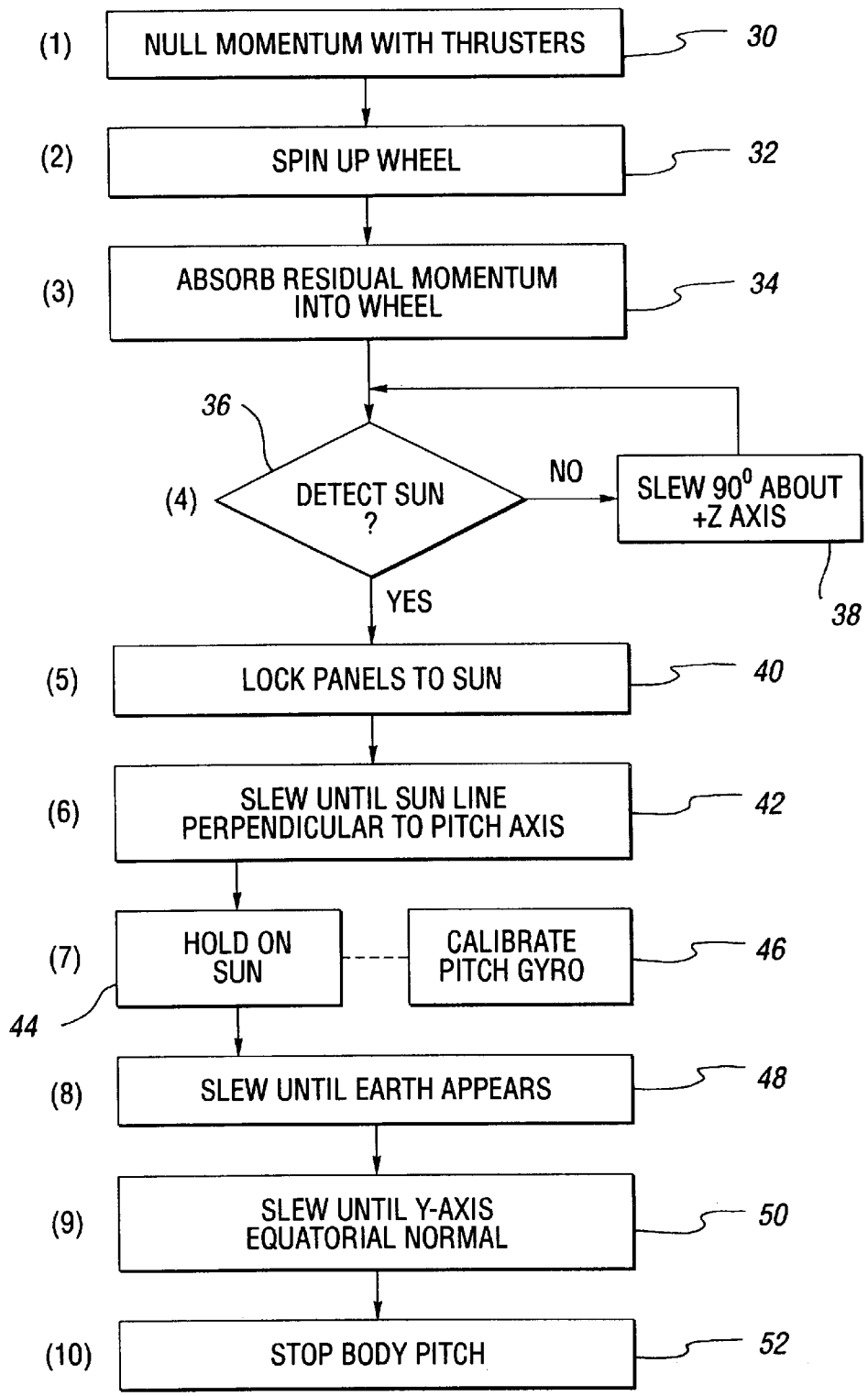
FIG. 2 is a flow-chart diagram illustrating a preferred embodiment of the present invention.

For sun acquisition, the satellite begins in a deployed condition and spinning. For a nominal acquisition, the satellite is spinning about the Z-axis. It is also preferred that the momentum wheel be unlocked and centered before acquisition. In this regard, it is preferable to test the wheel by spinning it up to a low rate and then back down again before deployments, to make sure it functions properly. Thereafter, the sequence of maneuvers for sun acquisition is as follows (see FIG. 2): (1) null momentum with thrusters 30; (2) spinup wheel 32; (3) absorb residual momentum into wheel 34; (4) perform "keyhole" maneuver if necessary 36,38; (5) lock panels to sun and track with solar wing drives and sun sensor 40; (6) slew about vector perpendicular to both the Y-axis and the sun line, until the sun is in the X-Z plane 42; (7) hold on sun in pitch 44, calibrate pitch gyro 46; (8) slew pitch axis about sun line until the Earth appears in the earth sensor 48; (9) slew about the Earth line until the Y-axis is equatorial normal 50; and (10) null body pitch rate with thrusters 52.

This procedure will now be described in greater detail, using the Hughes HS-601 satellite as an example. With respect to step (1), the satellite is spun down to about 45 ft-lb-sec of momentum before deployment and the gyros are turned on before deployment. After deployment, this momentum is nulled by sensing it with the gyros and pulsing thrusters to remove the sensed rates. Since any residual momentum will consume momentum wheel platform gimbal angle, the momentum needs to be nulled to about 0.75 ft-lb-sec. which would consume 1° of gimbal angle. This can be done with a single spin-down thruster. If the momentum remaining is still above the desired level, it will be removed in the next step. In the case with the Hughes HS601 satellite, spin-down requires a $-Z$ torque, which would normally be achieved using North, East, or West thrusters. The North thrusters are mounted at the four corners of the +Y face of the satellite body, with lines of action parallel to $-Y$. The four axial thrusters are similarly mounted on the $-Z$ face, parallel to +Z. The East face is the +X face, and the West face is the $-X$ face. As spin-down pulses excite nutation, the nutation can be removed by spacing the pulses one-half the nutation period apart in time.

In the next step, step (2), the spin motor brings the spin speed of the momentum wheel up to full momentum. This can take approximately 5–10 minutes. At this point, the momentum wheel is preferably spinning at about 4500 rpm. If the satellite had non-zero momentum before spinup, it will probably show up as a transverse rate. This can be removed by pulsing a jet parallel to the wheel spin axis, after waiting for the angular rate to rotate into alignment with the thruster torque. Any North thruster is sufficient to accomplish this. Since a North thruster can also be used for the spindown maneuver, providing a North thruster on the satellite is preferred, although a canted axial thruster would suffice. After removal of the transverse momentum, any remaining momentum will be aligned with the wheel axis. This can be taken care of subsequently with little delay or additional thruster usage. For example, during a transverse slew, the wheel will be rotated away from this residual momentum, and the North thruster will be able to remove the exposed component.

In step (3), the residual momentum is absorbed into the wheel. This keeps the wheel axis inertially oriented. The wheel can be gimballed to absorb it, leaving the body spin axis parallel to the pitch axis. It would be preferred to allocate some gimbal range for this purpose. It would also be preferable to allocate some gimbal range in the event that the pitch axis is not a principal axis (wobble). The wobble can be taken care of with a body-fixed wheel offset. At this point, allocating one degree for residual momentum is appropriate.

At this point, the satellite is rotating about the pitch axis, and the sun sensors will detect the sun within one revolution, unless the sun is eclipsed or within 15° of the pitch axis. According to step (4), if the sun is not detected in one revolution, the satellite is slewed transversely using the technique described above, until the sun is detected. That is, if the sun is not spotted in one pitch revolution, it is in a blind spot ("keyhole"). A 90° yaw slew will make the sun visible to sensors.

Until the sun is located, the solar panels remain pointed in the same direction as the sun sensor. In accordance with step (5), once the sun is detected, the solar panels are turned at a rate equal and opposite to the body spin rate to remain pointed to the sun. The panels are thus locked to the sun and the sun is tracked with the solar wing drives and the sun sensor. Since the sun sensor is exposed to the sun once per revolution of the satellite, that is every 2.5 to 8 minutes, sun tracking is quite insensitive to gyro error buildup.

At this point, the satellite is slewed about an inertial vector perpendicular to both the Y-axis and the sun line, until the sun is in the X-Z plane (step (6)). As soon as the sun is detected, the slew is commenced to bring the sun line perpendicular to the pitch axis. As discussed earlier, the momentum wheel is gimballed off to produce the desired body transverse rate, then coned at body spin rate to keep the body transverse rate fixed in inertial space. As the slew nears the goal, the canted sun sensor slit pulse PSI-2 will provide information on when to halt the slew. The slew rate is less than 10° per revolution and the canted sun sensor provides data to at least plus or minus 20° from the X-Z plane.

At this point, the satellite is in a safe power and thermal state. The pitch gyro is calibrated, if desired, while varying the spin speed with the wheel to allow the rate bias to be distinguished from the scale factor. This is step (7). The yaw gyro was similarly calibrated prior to step (1), while the spacecraft was spinning about body +Z.

As indicated in step (8), the satellite is then slewed about the sun line until the Earth appears. This is achieved in a similar fashion to step (6). At this point, the Y-axis is ecliptic normal and the spacecraft spin rate may be as high as 2.4° per second. Also, the static earth sensor provides useful data. The satellite is now slewed about the Earth line until the Y-axis is equatorial normal. In this regard, the yaw data from the spinning sun sensors (PSI-2, PSI-3/4) are used. It is presumed throughout that the gyro-based attitude propagation is being done onboard (for example, quaternion propagation), and use is being made of any optical data (from sensors such as the sun sensor, spun earth sensor, and static earth sensor) to correct these estimates.

In the last step, step (10), a second thruster is utilized to stop the body pitch rate. A single axial thruster aligned parallel to the Z-axis can accomplish this. By appropriate pulse timing, each spinup pulse can be used to remove any transverse momentum produced by previous pulses, and the wheel gimbal has more than enough momentum storage capability to store the undesired transverse momentum between pulses.

As indicated, by following the above method, sun acquisition of the satellite can be accomplished with just two thrusters, preferably a North and an Axial thruster. Of course, other combinations could be utilized, such as four canted axial thrusters.

By following the inventive procedure, the number of bipropellant thrusters required for a spinning satellite is reduced. Satellites typically using 13–16 thrusters can have that number reduced by at least four and perhaps by as many as nine thrusters. Not only would this reduce the use of irreplaceable propellant and increase the useful life of the spacecraft, it would also substantially reduce recurring costs per satellite.

As explained above, if the outer body spin axis is not a principal axis of the satellite, it will wobble because the spin about this axis produces an angular momentum component perpendicular to that axis. This effect can be reduced or eliminated, if desired, by gimbaling the wheel so that it has an equal and opposite transverse angular momentum.

Another preferred use of the present invention exists where the satellite has significant net momentum. In this situation, the present invention can be used for inversion, dual-spin turns, and creation and maintenance of nutation, such as 45°.

There are known techniques for increasing or decreasing the transverse rates (nutation) of a dual-spin or momentum bias satellite through internal torques. These include modulating the spin motor at nutation frequency to damp or dedamp nutation and use of a gimbal between the rotor and platform of a dual-spin satellite or between the momentum wheel and bus of a momentum-based satellite. Similarly, the wheel spin motor has been used to take the satellite from a condition where all of the elements of the satellite are spinning at the same angular rate ("flat-spin") to the typical operational state where one body spins at orbit rate, and the other much more quickly. This latter technique is called the "dual-spin turn" when used on momentum biased satellites for acquisition. It is also the same as the "flat-spin recovery maneuver" used on dual-spin satellites.

Figure 3:
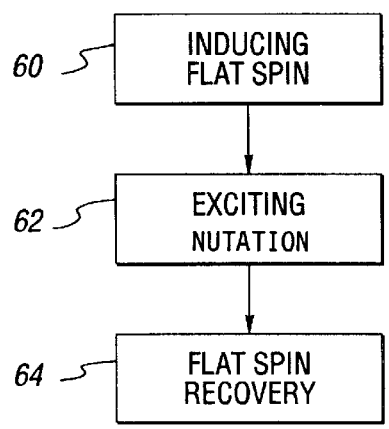
FIG. 3 is a flow-chart diagram illustrating a second embodiment of the invention.

There are two useful maneuvers that can be accomplished using nutation, namely damping/dedamping techniques, such as inversion maneuvers, and deliberate maintenance of a controlled amount of nutation. Although inversion maneuvers are not new, they are conventionally done with thrusters which consume irreplaceable fuel. In accordance with the present invention, an inversion maneuver is initiated by deliberately inducing flat spin 60, then exciting nutation with internal torques 62, and performing an inverted flat-spin recovery 64 (see FIG. 3). The flat-spin recovery is similar to conventional flat-spin recovery, except the spin torquing is in the reverse direction. This technique is similar to that described by Fong (U.S. Pat. No. 5,067,673) for inverting dual-spin spacecraft using platform product-of-inertia coupling, except that it can be applied to any momentum bias spacecraft with the capability to store angular momentum transverse to the spin axis, by such means as: (1) transverse gimbal(s) on the momentum wheel(s); (2) transverse wheel(s) in addition to the spin wheel(s); (3) "Vee" wheels—spin momentum wheels that are deliberately non-parallel so that by the sum of their spin speeds dictates spin momentum, and the difference of their spin speeds dictates transverse momentum.

The time required for the flat-spin recovery is reduced by the use of the same nutation-coupled internal torquing means to damp out nutation at the end of the maneuver. Also, in this regard, the spacecraft must be designed to operate in both regular and inverted attitudes, but this is often the case.

The installation of a controlled amount of nutation and then maintaining it is accomplished using typical nutation control elements. However, the elements must be able to command a non-zero value for the desired nutation, and operate the nutation-coupling actuators to either damp or dedamp nutation, depending on when the sensed nutation is greater or less than the commanded value. In this regard, the sensed nutation is sensed by accelerometers, gyros, or earth/sun/star sensors.

Deliberate introduction of a controlled amount of nutation is useful in many applications, such as antenna pattern mapping, safe hold after a fault, and attitude determination. In pattern mapping, portions of the payload beams are swept across the ground measurement station that would not normally reach that elevation.

As to safe holding after a fault, solar power can be maintained by providing 45° of nutation if the sun lies along the post-fault momentum vector. In this manner, the solar panels will receive sunlight (on a dual-spin satellite), or they can be made to track the sun via sun sensors and solar wing drives (on a momentum bias satellite).

A safe hold after a fault would also ensure telemetry opportunities. The command/TM antenna patterns on many satellites are not truly omnidirectional. A hold at 45° of nutation would let the antenna pattern sweep the sky for the ground station. This could be enabled automatically under certain conditions, such as if no ground response was obtained after a predetermined period after a fault, the attitude sensors indicated that the satellite was not in its nominal orientation, or the attitude sensors failed.

Moreover, there are situations in transfer orbit and in anomaly recoveries where the sun or Earth is slightly out of reach of the appropriate sensors. By inducing nutation for attitude determination, a fix could be obtained. This procedure would benefit from accurate nutation sensors, preferably rate gyros used with an attitude propagation algorithm.

Not only could the procedures of the present invention be utilized to reduce the number of thrusters for a satellite and thus save fuel and expense, but the maneuvers could be used on existing satellites in the event of attitude thruster failures. The proposed sun-earth maneuvers could be done with the solar panels deployed, and acquire and maintain solar power in a relatively short time. Also, as indicated, the invention preferably relates to satellites that can store significant angular momentum along one body direction (for example in a momentum wheel), and have a limited capacity for storing angular momentum in a direction transverse to the first body direction. The present invention has preferred use for two types of maneuvers, where the satellite has near-zero net momentum, and where the satellite has significant net momentum. In either case, the use of thrusters is significantly reduced or eliminated.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A method for satellite acquisition comprising:
   nulling the momentum of the satellite, wherein the satellite has a pitch axis,
   spinning a momentum wheel in the satellite, wherein the momentum wheel has a spin axis,
   absorbing residual momentum,
   fixing at least one solar panel on the sun,
   slewing about a vector substantially perpendicular to a sun line aimed at the sun,
   slewing around said sun line,
   slewing around a line aimed at the Earth until the pitch axis is equatorial normal, and
   terminating a pitch rate,
   wherein at least one of the slewing steps is performed in a state of near-zero momentum using slews transverse to the spin axis of the momentum wheel when the satellite has a near-zero momentum dual spin configuration, and wherein the momentum wheel is gimbaled off to produce a body transverse rate, then coned at a body spin rate to keep the body transverse rate fixed in inertial space.

2. The method as set forth in claim 1 further comprising the step of slewing until the sun is detected.

3. The method as set forth in claim 1 further comprising the step of tracking the sun by solar wing drive means and sun sensor means.

4. The method as set forth in claim 1 wherein said step of slewing about a vector is achieved by gimbaling the momentum wheel.

5. The method as set forth in claim 1 further comprising calibrating a pitch gyro while the satellite is aimed at the sun.

6. The method as set forth in claim 1 wherein said satellite is slewed around said line aimed at the sun until the Earth appears.

7. The method as set forth in claim 1 further comprising the step of propagating the gyro-based attitude and using optical data to correct data estimates.

8. The method as set forth in claim 1 wherein said step of nulling the momentum is achieved by using a thruster.

9. The method as set forth in claim 1 wherein said step of terminating the pitch rate is achieved by using a thruster.

10. The method as set forth in claim 1 wherein the satellite has a near-zero net momentum.

11. A method for sun acquisition of a spinning satellite, said satellite having a gimballed momentum wheel, thruster means and solar panel means, said method comprising the steps of:

securing spin-down of said satellite, damping the nutation of said satellite, slewing said satellite about a sun line and an Earth line, and securing spin-up of said satellite, wherein the slewing step is performed in a state of near-zero momentum using slews transverse to a spin axis of the momentum wheel when said satellite has a near-zero momentum dual spin configuration, and wherein the momentum wheel is gimbaled off to produce a body transverse rate, then coned at a body spin rate to keep the body transverse rate fixed in inertial space.

* * * * *